April 28, 1931.  R. G. CAMBLIN  1,803,231
REEL
Filed Sept. 7, 1927
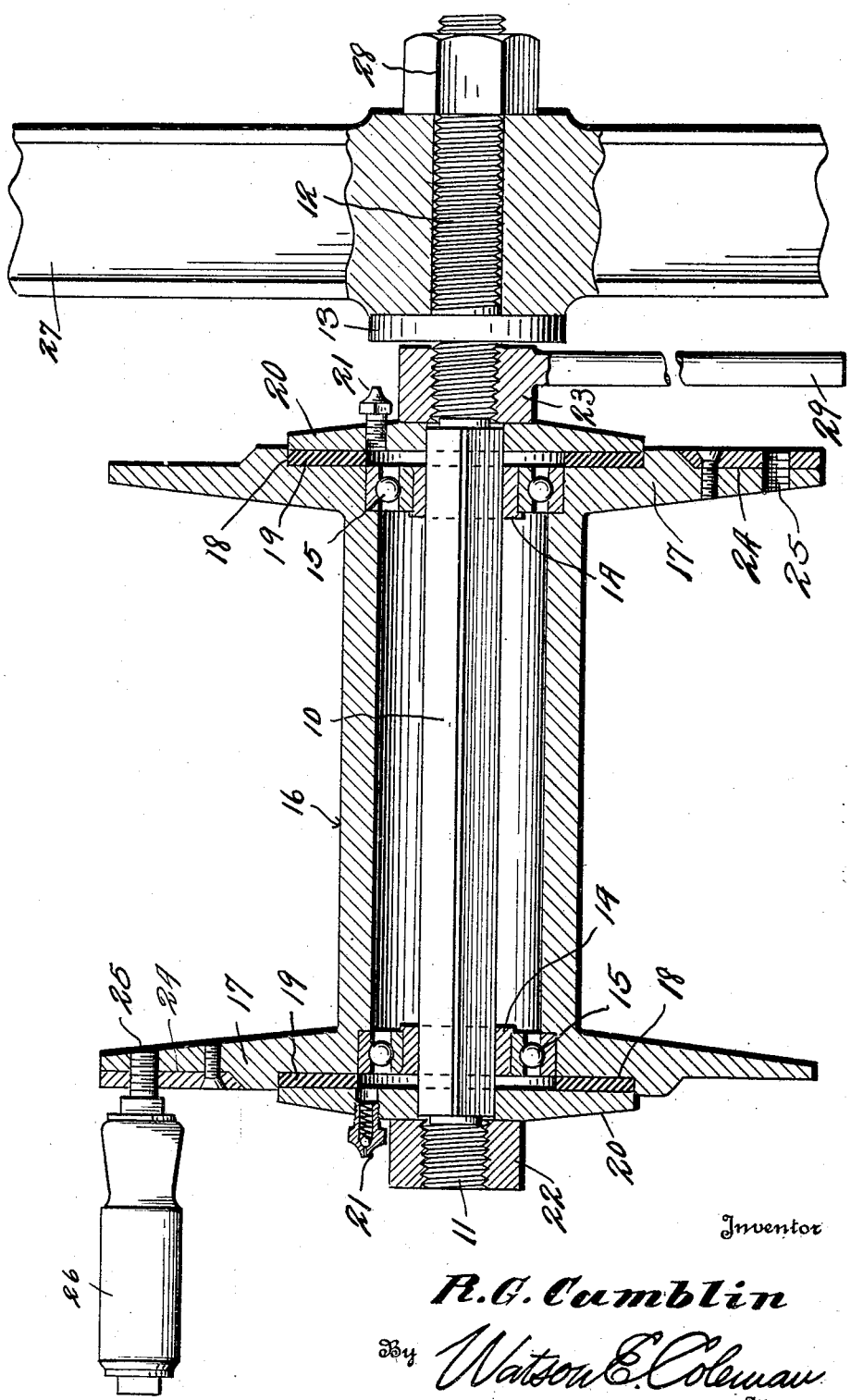

Patented Apr. 28, 1931

1,803,231

UNITED STATES PATENT OFFICE

ROBERT G. CAMBLIN, OF WEWOKA, OKLAHOMA

REEL

Application filed September 7, 1927. Serial No. 218,074.

This invention relates to reels and more particularly to a reel for handling the deep well measuring lines employed in conjunction with oil wells.

An important object of the invention is to provide a device of this character which will be relatively simple in its construction and operation and which will provide means for readily clutching or unclutching the reel to the supporting shaft thereof and in which the clutching mechanism may be employed when the device is being hand-operated or rotated through the pull exterted by the weight of the measuring line to brake the operation of the reel to obtain a desired speed or to check the rotation thereof at a desired point.

A further object of the invention is to produce a device of this character which is so constructed that it may be readily hand-operated and which may be efficiently lubricated.

These and other objects I attain by the construction shown in the accompanying drawings, wherein for the purpose of illustration is shown a preferred embodiment of my invention and wherein:—

The figure is a longitudinal sectional view of a reel or spool constructed in accordance with my invention and the mounting therefor, the support being partly broken away.

Referring now more particularly to the drawing, the numeral 10 indicates a spline shaft, at opposite ends of which are a relatively short reduced threaded section 11 and a relatively long threaded section 12. The relatively long threaded section 12 has intermediate its ends and more nearly adjacent the spline an integral outstanding flange 13.

Upon the spline are mounted bushings 14 supporting bearings 15 which in turn support a reel 16. The end flanges 17 of the reel are exteriorly recessed adjacent their inner edges, as at 18, for the reception of annular friction washers 19, preferably composed of leather. Likewise mounted upon the spline are disks 20 for coaction with the friction elements 19 and these disks are provided with valved nipples 21 through which a lubricant may be introduced to the space formed by and between the spline, washer, discs and the reel body.

Upon the short threaded section 11 is mounted a nut 22 against which one end plate 20 abuts, while upon the portion of the longer threaded end 12 lying between the flange 13 and the spline is mounted a lever nut 23. Each reel flange is reinforced, as at 24, adjacent its outer edge and provided at this reinforced portion with a threaded opening 25 for the reception of a handle 26 whereby the reel may be rotated. The portion of the larger threaded extension lying outwardly of the flange 13 from the spline is adapted to be passed through the opening of a bracket 27, of which a fragment is illustrated of the character usually employed in connecting such reels to the fly wheels of the derrick engine (not herein illustrated). At the outer end of the threaded portion 12, a nut 28 is mounted to secure the shaft in position.

It will be obvious that by rotating the lever nut 23 through its handle 29, this nut may be either forcibly engaged against the adjacent end plate 20 or disengaged therefrom. When the nut is engaged against the plate 20, this plate comes into forcible engagement with its friction element and forcing the reel bodily longitudinally of the shaft 10 causes forcible engagement between the other of the plates and its friction element, so that the reel is locked to the shaft 10 to an extent determined by the force applied through the nut. Thus, the reel, if the shaft 10 is being rotated, is locked therewith for rotation or if the spline 10 is stationary, it is locked against rotation, if the force applied is sufficient. While if the force applied is insufficient, a braking action is set up, tending to check the rotation of the reel, so that the movement of the measuring line (not herein disclosed) may be observed.

It will be obvious that in employing ball bearings, the operation of the reel, when freed from the shaft and through the handle 26, is considerably lightened and it will furthermore be obvious that the brake can be employed coincidentally with hand operation.

Particular attention is called to the fact that the spool or reel 16 is reversible, both end flanges of the reel being formed with the threaded openings 25 for the reception of the handle 26, so that the reel may be turned end for end upon the spline shaft and the handle engaged with either flange. Furthermore, this reel is provided with ball bearings, the advantage of which has been adverted to and provided with an oiling system whereby all of the parts may be lubricated.

My improved reel can be made large enough for a torpedo reel adapted for use with wells four thousand feet deep or over. Friction may be readily applied to retard movement of the reel or to lock the reel to the spline shaft. Furthermore, by this construction, the amount of friction or retardation applied to the reel to brake it may be very delicately controlled by the nut 23.

The reel or spool is reversible, so that it may be turned over in case that the line is wound on backwards. Sometimes, the man that puts the measuring line on the reel or spool puts it on from right to left. The reel is held by a set of clamps which are in turn attached to the fly wheel of the engine. If the reel is run on a steam engine, well and good, as such engines are reversible but a gas engine only runs one way so that in that case, the line is wound upon the spool backwards.

Since the construction hereinbefore set forth is capable of a certain range of change and modification without materially departing from the spirit of the invention, I do not limit myself to such specific structure except as hereinafter claimed.

I claim:—

In a reel for measuring lines for deep wells, a spline shaft, a reel rotatable about the spline shaft, bearings supporting the reel from the spline shaft with the inner side of the reel spaced therefrom, plates mounted upon the spline shaft at opposite ends of the reel, annular friction members arranged between the plates and the ends of the reel and cooperating with the plates, bearings and spline shaft to provide lubricant reservoirs communicating with the bearings, and valved nipples carried by the plates and communicating with the reservoirs.

In testimony whereof I hereunto affix my signature.

ROBERT G. CAMBLIN.